US006606103B1

(12) United States Patent
Hamlet et al.

(10) Patent No.: US 6,606,103 B1
(45) Date of Patent: Aug. 12, 2003

(54) INFINITE RESOLUTION SCHEME FOR GRAPHICAL USER INTERFACE OBJECT

(75) Inventors: Tim Hamlet, Jacksonville, FL (US); Robert Umbehant, Ponte Vedra Beach, FL (US)

(73) Assignee: UHC LLC, Jacksonville, FL (US)

( * ) Notice: Subject to any disclaimer, the term of this patent is extended or adjusted under 35 U.S.C. 154(b) by 0 days.

(21) Appl. No.: 09/450,557

(22) Filed: Nov. 30, 1999

(51) Int. Cl.$^7$ ............................................. G06F 3/00
(52) U.S. Cl. ..................... 345/764; 345/778; 345/660; 345/472.2; 345/443
(58) Field of Search ................. 345/716, 727, 345/764, 800, 472, 472.2, 16, 441, 443, 765, 778, 469.1, 660, 666, 667, 668, 671, 689

(56) References Cited

U.S. PATENT DOCUMENTS

| | | | |
|---|---|---|---|
| 4,642,625 A | 2/1987 | Tsunehiro et al. | 345/441 |
| 4,736,330 A | 4/1988 | Capowski | 345/501 |
| 4,800,510 A | 1/1989 | Vinberg et al. | 345/440 |
| 4,808,988 A | 2/1989 | Burke et al. | 345/16 |
| 5,243,447 A * | 9/1993 | Bodenkamp | 345/629 |
| 5,289,205 A | 2/1994 | Torres | 345/685 |
| 5,469,189 A | 11/1995 | Noguchi et al. | 345/620 |
| 5,642,476 A | 6/1997 | Turner | 345/443 |
| 5,659,674 A * | 8/1997 | Doyle et al. | 345/619 |
| 5,721,853 A | 2/1998 | Smith | 345/803 |
| 5,801,688 A | 9/1998 | Mead et al. | 345/700 |
| 5,838,321 A | 11/1998 | Wolf | 345/803 |
| 5,845,058 A | 12/1998 | Shaw et al. | 358/1.15 |
| 5,867,633 A | 2/1999 | Taylor, III et al. | 358/1.9 |
| 5,877,963 A * | 3/1999 | Leung et al. | 700/223 |
| 5,881,213 A | 3/1999 | Shaw et al. | 358/1.15 |
| 5,896,121 A | 4/1999 | Kafer | 345/418 |
| 5,974,181 A * | 10/1999 | Prieto | 382/232 |
| 5,983,190 A * | 11/1999 | Trower, II et al. | 704/276 |
| 6,057,854 A * | 5/2000 | Davis, Jr. et al. | 345/619 |

FOREIGN PATENT DOCUMENTS

| | | |
|---|---|---|
| JP | 2203392 | 8/1990 |
| JP | 2303490 | 6/1992 |

* cited by examiner

Primary Examiner—Raymond J. Bayerl
Assistant Examiner—Kieu D. Vu
(74) Attorney, Agent, or Firm—Hunton & Williams LLP

(57) ABSTRACT

A method and system for creating a controllable, shaped, and scalable graphical user interface ("GUI") object for use in an application program displayed on a computer. An infinite resolution scheme according to the present invention may display a GUI in any shape at any size with minimal or no loss of original image quality. Infinite resolution may be accomplished by storing optimized vector image data ("OVID"), as opposed to raster-type data, for the outline and body of the image to be displayed. When the image is resized or reshaped, the OVID is accessed so that the original quality of the image is captured and maintained.

26 Claims, 16 Drawing Sheets

306

307

INFINITE RESOLUTION SCHEME FOR GRAPHICAL USER INTERFACE OBJECT

FIELD OF INVENTION

The present invention relates to the field of graphical user interfaces ("GUIs") and, more particularly, to a method and system for scaling and displaying a controllable GUI in any shape, at any size with minimal or no loss of original image quality by implementing an infinite resolution scheme where optimized vector image data format is used for the GUI image.

BACKGROUND OF THE INVENTION

Graphical User Interfaces have become increasingly common and useful on computers. GUIs provide a quick and convenient interface on a computer where the method of invoking commonly used personal data is greatly simplified. GUIs are generally illustrative of the function they perform. A pointing device, such as a mouse, may be used as an input mechanism so that a particular program embedded in the GUI is invoked by the user through a simple click of the mouse. The amount of information that a user is required to recall is significantly reduced through the use of GUIs.

The efficiencies and programming advantages related to GUIs permit users to perform more sophisticated applications and invoke user defined programs. GUIs may be custom-designed to accommodate the needs of individual users. As GUIs support more user defined applications, they become more pervasive and useful in computer applications.

However, computer graphics generally degrade in quality and appearance with size changes. Details are lost as images are enlarged and minimized thereby diminishing the quality and use. Currently, GUI's are not designed as replaceable objects although they are often referred to as "objects". Existing applications that provide the ability to change the appearance generally restrict the designs to the original shape (e.g., simple rectangles) and control layouts specified by the original applications program.

These and other drawbacks exist with current systems.

SUMMARY OF THE INVENTION

An object according to the present invention is to overcome these and other drawbacks with existing systems.

It is another object of the present invention to provide an infinite resolution scheme for displaying computer graphics.

It is an object of the present invention to provide a method and system for infinitely scaling and displaying a GUI with minimal or no loss of image clarity, color, functionality and design resolution.

It is another object of the present invention to provide a GUI object where the shape and image are defined by optimized vector image data, as opposed to traditional raster image data, so that the shape and image of the GUI object may be easily created with any common drawing program, may be easily modifiable, and may retain scale relationships at different sizes without additional processing.

The present invention provides a method and system for easy creation of a controllable, shaped, and scalable GUI object for use in an application program displayed on a computer. The present invention provides a method and system for implementing an infinite resolution scheme for displaying a computer graphic in any shape, at any size with minimal or no loss of original image quality. Infinite resolution may be accomplished by storing optimized vector image data ("OVID"), the source of which may be extracted from any standard vector image data file format, including enhanced metafile ("EMF") format, as opposed to raster-type data, for the outline and the body of the image to be displayed. The data may be stored in a database. Before storage, the OVID data may be encrypted, compressed, and check summed so that the database is very compact and hack resistant. When the image is displayed, the stored OVID is decompressed and decrypted where the OVID is used to display the image. If the image is resized (enlarged or made smaller) the OVID is once again accessed. Thus, the image does not deteriorate while changes are made to the size and shape of the image.

The infinite resolution scheme may be used in any program. One advantage of the present invention is that coding is greatly simplified. Instead of specifying a GUI image comprising many raster images, the OVID, which may be created separately from the controlling application program, may be incorporated into the coding as an independent object used to display the GUI image and controls. The infinite resolution scheme may be used to generate graphics for various applications, including a shaped GUI and direct-x games. For example, in a shaped GUI, infinite resolution may be used to create a graphical clock program or other interactive image program for use on a computer desktop. The clock program may display an "analog style" clock (i.e., hour, minute and second hands) on a user's desktop where the user may program different audio and visual alarms and displays as reminders. In another example, the infinite resolution scheme may be used to create a clock with a number of different appearances including a planet logo, an animal logo, and various sports related logos. The present invention implements an infinite resolution scheme that defines function, not appearance of a layout, and therefore the GUI object's original appearance may be created with minimal or no loss.

Other objects and advantages of the present invention will be apparent to one of ordinary skill in the art upon reviewing the specification herein.

DETAILED DESCRIPTION OF THE PREFERRED EMBODIMENTS

A method and system of the present invention provides a controllable, shaped, infinitely scalable GUI which is defined by optimized vector image data that displays minimal or no discernable loss of original design image resolution at any size. The present invention includes an image pre-processor that encodes GUI image data in OVID format. The pre-processor also defines and stores user control and sub-control areas. An image display processor may be either internally or externally linked to an application program that decodes the GUI object file and displays the GUI display image including all component elements as defined by the pre-processor. The original GUI design may be of any shape and may incorporate enclosed, void, and discontinuous control and display areas as defined by the pre-processor. The application program including a program control cursor may respond in any designated manner. The GUI display may be altered either programmatically or automatically by user activation of control and sub-control areas and other programmed event or events as defined by the GUI object and the application program. The OVID may be created separately from the application program and may be incorporated into coding as an independent object used to display the GUI image.

Figure 1:
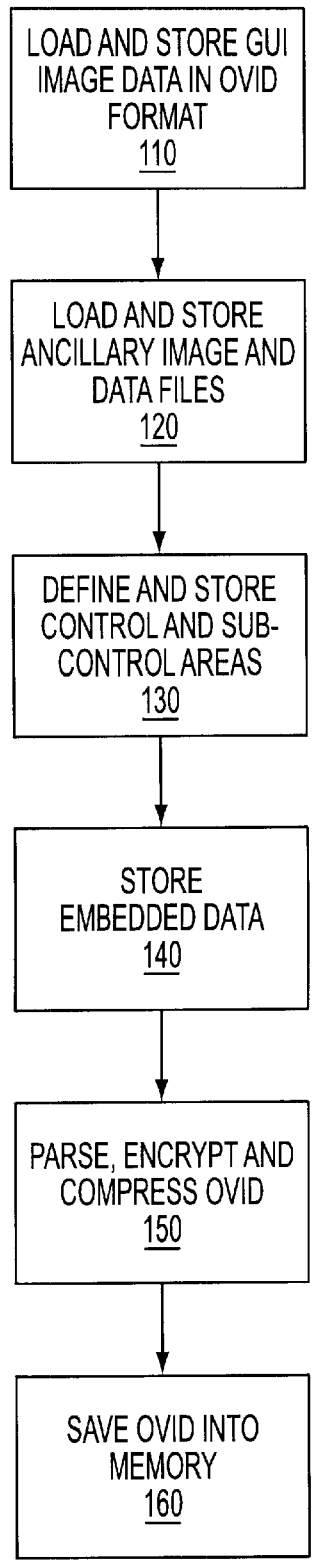
FIG. 1 is a flowchart of a pre-processing method according to an embodiment of the present invention.

FIG. 1 is a flowchart of a pre-processing method of an infinite resolution scheme according to an embodiment of the present invention. At step 110, the GUI image data may be loaded and stored in OVID format. Image data may include vector or raster images defining body designs, borders, animations, overlays, textures, icons, buttons, and other image components that may be deemed necessary to the proper operation of the application program.

In one example, the infinite resolution scheme according to the present invention may be used to construct a clock design scheme. Other applications of the infinite resolution scheme are available and may be implemented in accordance with the present invention. A clock design scheme is but one example. Other applications may include an electronic card (e.g., e-card) where the image of the card may be placed on a user's computer screen. The image of the card may include a personal message or greeting. The card may include other features, such as animation and sound which may include speech and music. By using the infinite resolution scheme of the present invention, the greeting card image may be extracted and placed on the user's computer screen where the image may be resized with minimal loss of original image quality. Another application may include electronic advertisements (e.g., e-advertisements) where an advertisement for a product, service, or web-site may be placed on the user's computer screen in accordance with the infinite resolution scheme of the present invention. The advertisement may also provide a link to the web-site of the product or service offered for sale. The advertisement image may also include information about the product or service in animated form. Other applications may include informational or educational tools. Another application of the infinite resolution scheme of the present invention may include a polymorphic web browser where the area bordering the window may contain icons, messages and other images. The images may be animated and may further include links to other web-sites.

Figure 3A:
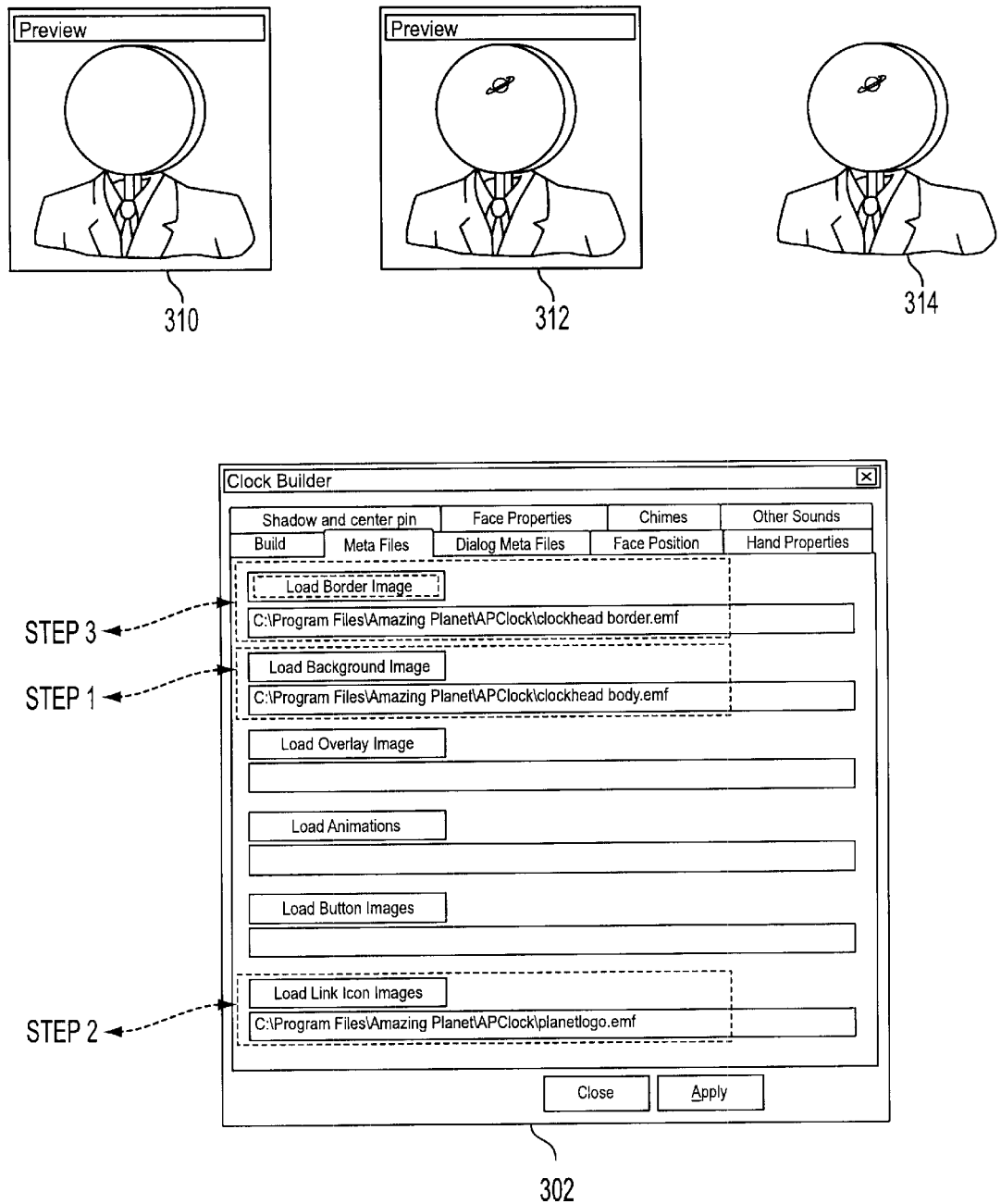
FIG. 3a is an illustration of a GUI object data loading procedure according to an embodiment of the present invention.

Image data may include a vector image file, a vector mask file and a vector overlay file. FIG. 3a illustrates an example of a GUI object data loading procedure. The GUI image file may include image data used to construct the background image for a clock or other image. Implementation of the GUI image file may include loading a background or body vector image at 310, loading a link icon vector image at 312, and loading a border vector image at 314. A vector mask file may include vector data that defines the cutout region for the image (e.g., clock window) including voids. A vector overlay file may include data used to construct the overlay image for the image design (e.g., clock image). Image designs that implement the infinite resolution scheme of the present invention may incorporate any shape as the region area boundary may include void or empty areas. Furthermore, an image design (e.g., a clock design) may be resized to any scale and maintain all details of the original image design, including region boundary areas. More importantly, since the original vector data is being used at all stages of the process, the final image displays minimal loss of original image quality when the image is resized or reshaped. Screen 302 illustrates an example of a data loading procedure where the information shown in 310 is provided in step 1, the information shown in 312 is provided in step 2, and the information shown in 314 is provided in step 3. However, the information shown in 310, 312, and 314 may be provided in any order.

Step 120 involves loading and storing ancillary image and data files. Such information may include database files, text files, document files, multimedia files, and other data or files that may be deemed necessary to the proper operation of the application program. Further examples of ancillary image and data files may include sound, music, animation and video files. For example, in a clock design scheme application, ancillary image and data files may include alarm sounds, clock hand positions, color schemes, and size and shape of the image. At step 130, control and sub-control areas of the vector image data files are defined and stored. In addition, image component characteristics including position, size, animation speed, and interactive behavior may be defined.

Figure 3B:
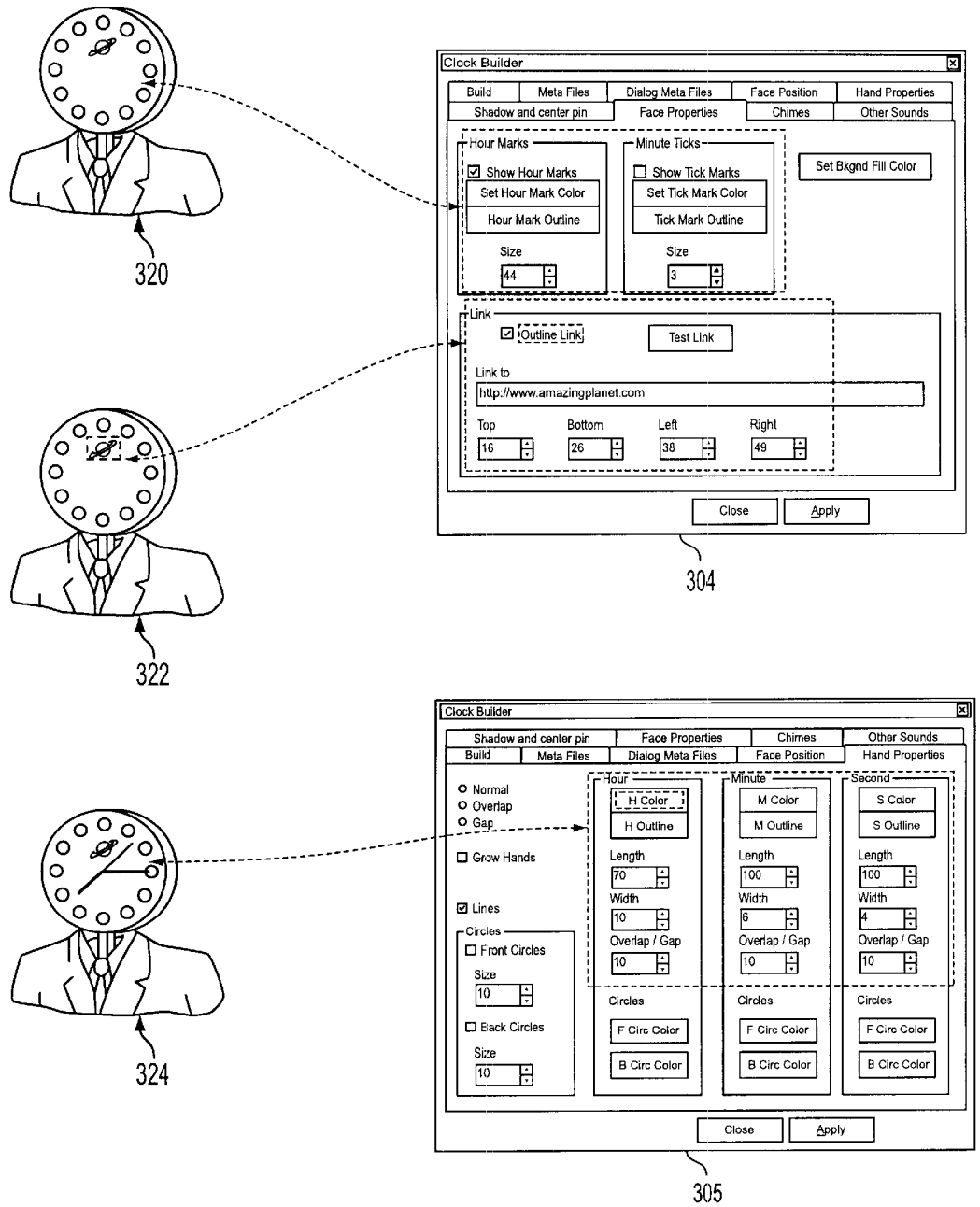
FIG. 3b is an illustration of a GUI object embedded data procedure according to an embodiment of the present invention.
Figure 3C:
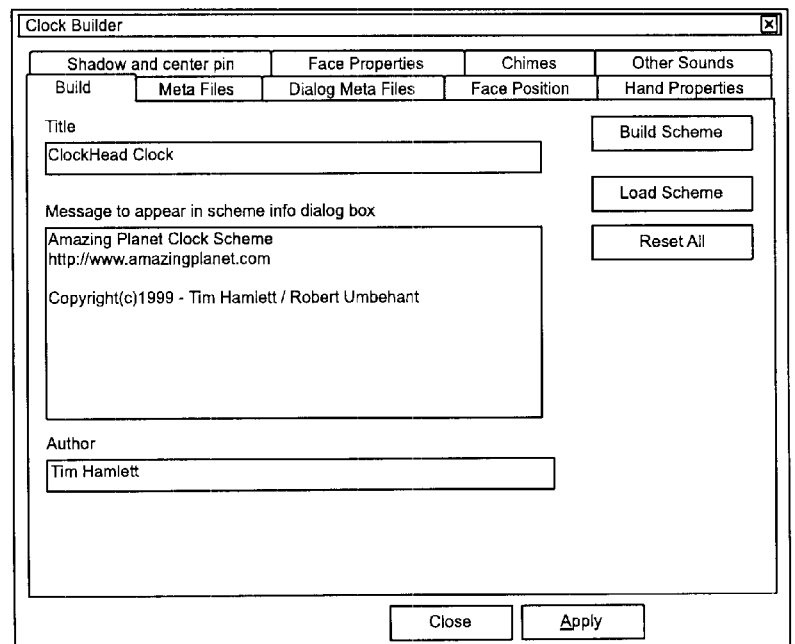
FIG. 3c is an illustration of a GUI object embedded data procedure using static text and external file data of unrelated types according to an embodiment of the present invention.
Figure 3C:
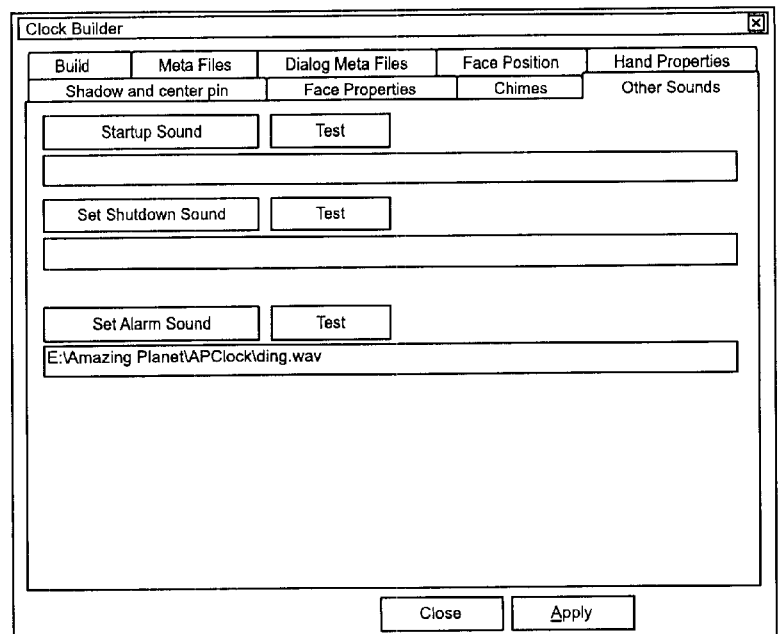

At step 140, embedded data which may include static data, variable data, internal links, external links to application and system processes is stored in memory. FIG. 3b and 3c illustrate examples of GUI object embedded data. More specifically, embedded data may further include design information, copyright information, constants, triggers, actions and defaults, as shown in screen 306. For example, in a clock design application, embedded data may include animation elements, such as hour, minute, and second tick marks and properties, as shown in 320 and 324. Animation elements may also be implemented in the alarm so that the clock image bounces or performs other animated acts to alert the user. Animation of the alarm may be used alone or in conjunction with a sound data file. Other embedded data may encompass link icon sub-control area location, size and embedded link data, such as a web-site's address, as shown in 322. Embedded external files may include sound data files for alarms, startup, shutdown, and other functions as shown in screen 307. Screens 304 and 305 illustrate an example of an embedded data procedure.

At step 150, optimized vector image data may be parsed, encrypted and compressed. The image and feature database is constructed at this stage. Infinite resolution may be accomplished by storing optimized vector image data, the source of which may be extracted from any standard vector image data file format, including EMF format, for the outline and body of the image to be displayed. Data is compressed and very compact so that space is conserved and data is virtually hack-resistant. If the data is altered or tampered, the present invention may invoke a security feature that ceases program operation. This feature provides high security and is useful in software distribution. Applications may be executed from self-extracting archives. The entire application may run from a compressed file. Thus, bandwidth on the front end and back end is saved. The compressed and encoded information may then be saved to non-volatile memory, at step 160.

Figure 2:
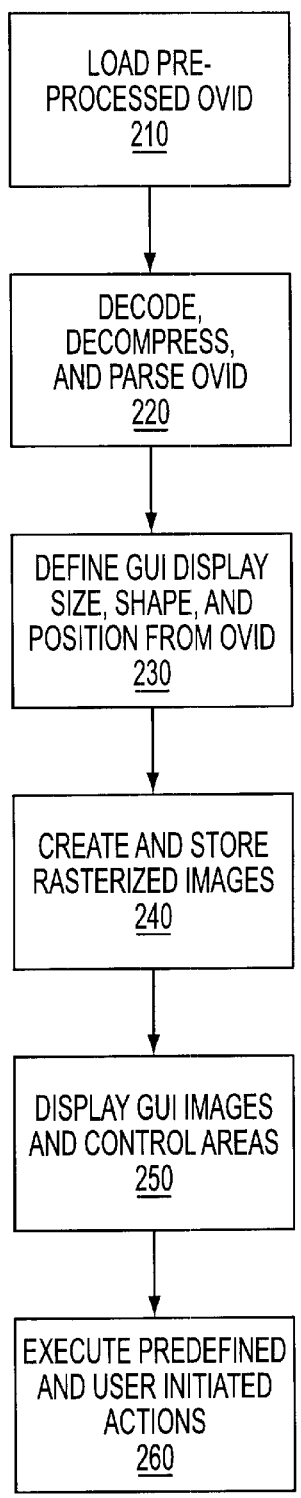
FIG. 2 is a flowchart of a post-processing method according to an embodiment of the present invention.

FIG. 2 is a flowchart of a post-processing method of an infinite resolution scheme according to an embodiment of the present invention. At step 210, OVID as described in FIG. 1 may be loaded into an application program. OVID may be created separately from the application program. Step 220 may include decoding, decompressing and parsing the OVID as illustrated in FIG. 1 into appropriate memory buffers. The post-processing method may be used to extract an image design vector image scheme and display the image design. Once the OVID file has been read and images have been extracted, the vector files may be processed. The vector image file may be processed to produce temporary bitmap images. The vector mask file may be processed to produce a dialog border cutout. The vector overlay may then be processed. The image data collected and processed may be used to construct and display the image design which may be updated periodically (e.g., every second) or according to a schedule to preserve the original image. Thus, image deterioration is minimized and virtually eliminated.

At step 230, appearance characteristics of the GUI object may be defined from the OVID. Appearance characteristics may include display size, display shape, screen position, and other features. These features may be defined programmatically or may be controlled by the user. Step 240 may include creating temporary memory buffers and constructing rasterized versions of the GUI images and control areas. At step 250, the GUI images and control areas on the computing device screen may be displayed. The GUI displayed may appear in color as described by the original vector drawing data where the GUI may contain voids and discontinuous control areas. When the image is displayed, the original vector image data stored in EMF format may be used to display the image. If the image is enlarged or made smaller, the EMF data may be accessed again to display the resized or reshaped image. Also, the GUI image and control areas of the GUI object may be scaled according to the user's preferences. At step 260, predefined and user initiated actions may be executed as defined by the pre-processor and application program.

Figure 4:
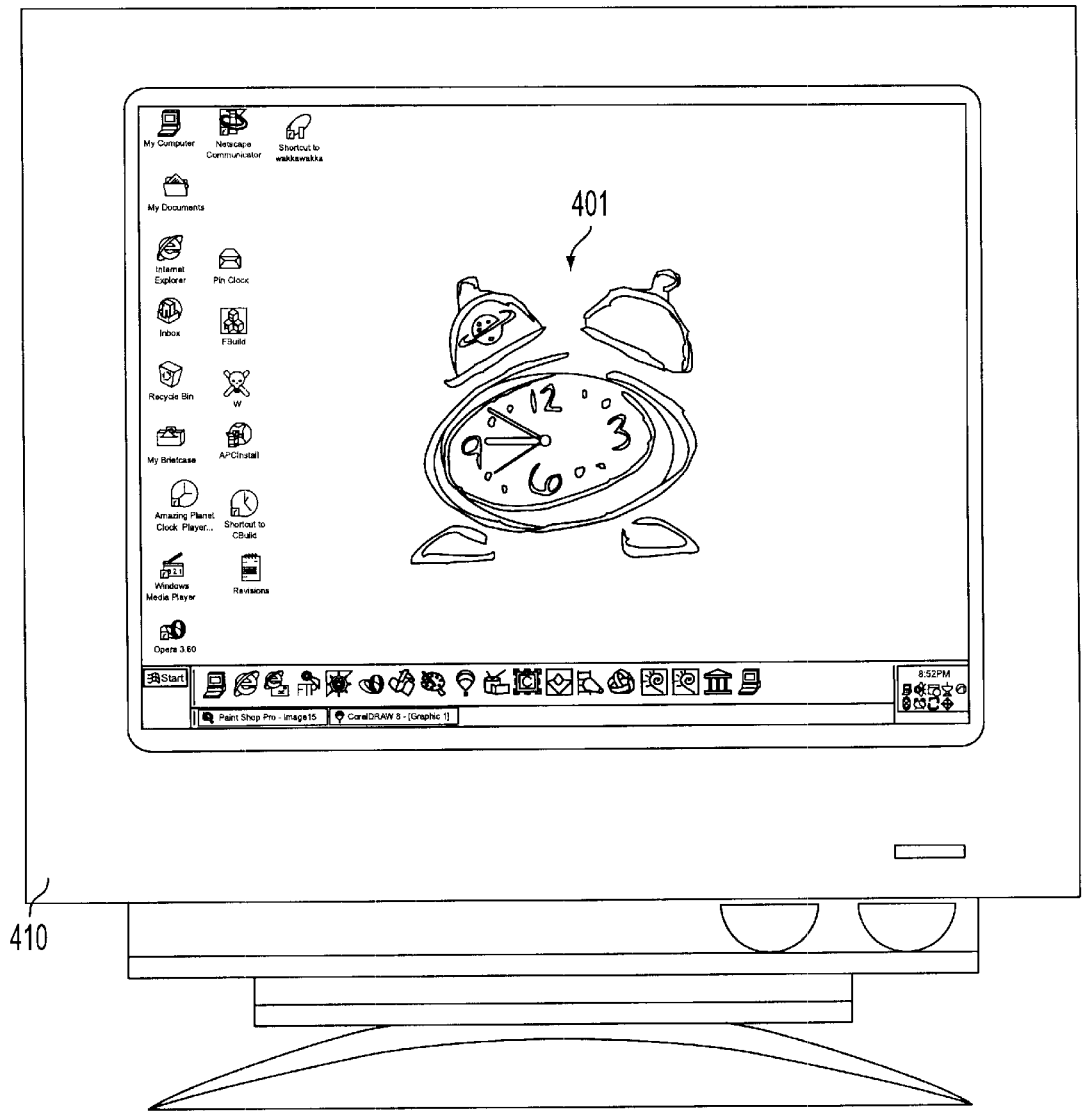
FIG. 4 is an illustration of a GUI object as it appears on a computer screen according to an embodiment of the present invention.
Figure 5:
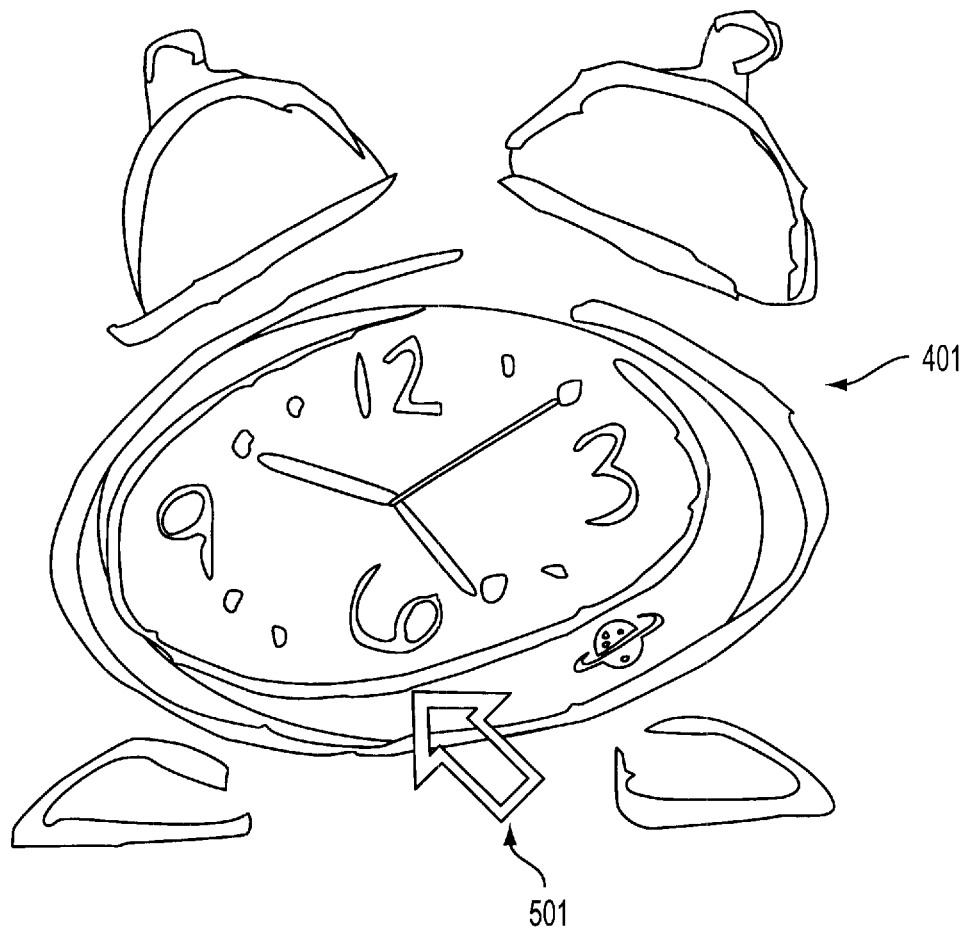
FIG. 5 is an illustration of a GUI's interactive control areas according to an embodiment of the present invention.
Figure 6:
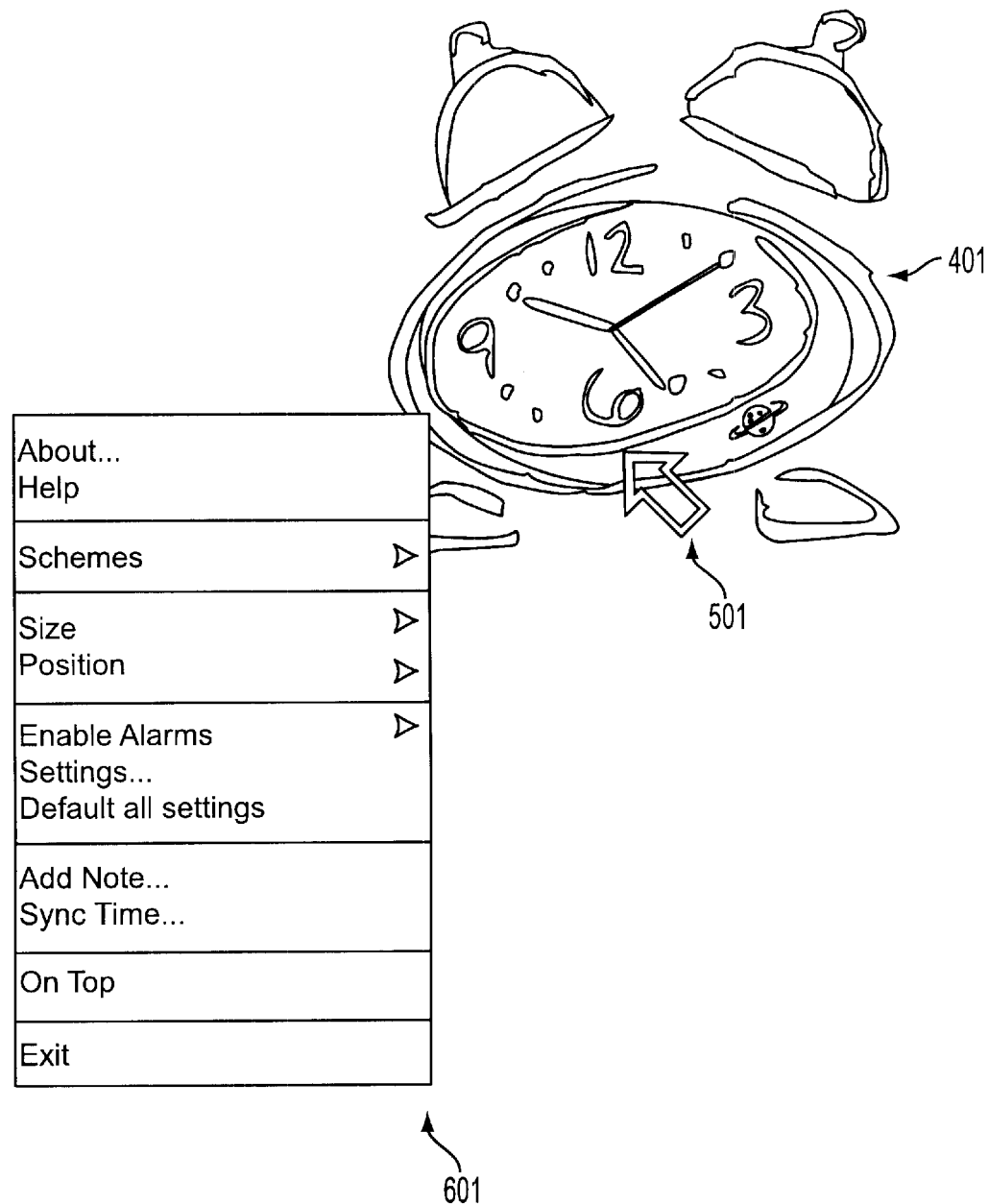
FIG. 6 is an illustration of the functionality of a GUI object interactive control areas according to an embodiment of the present invention.
Figure 7:
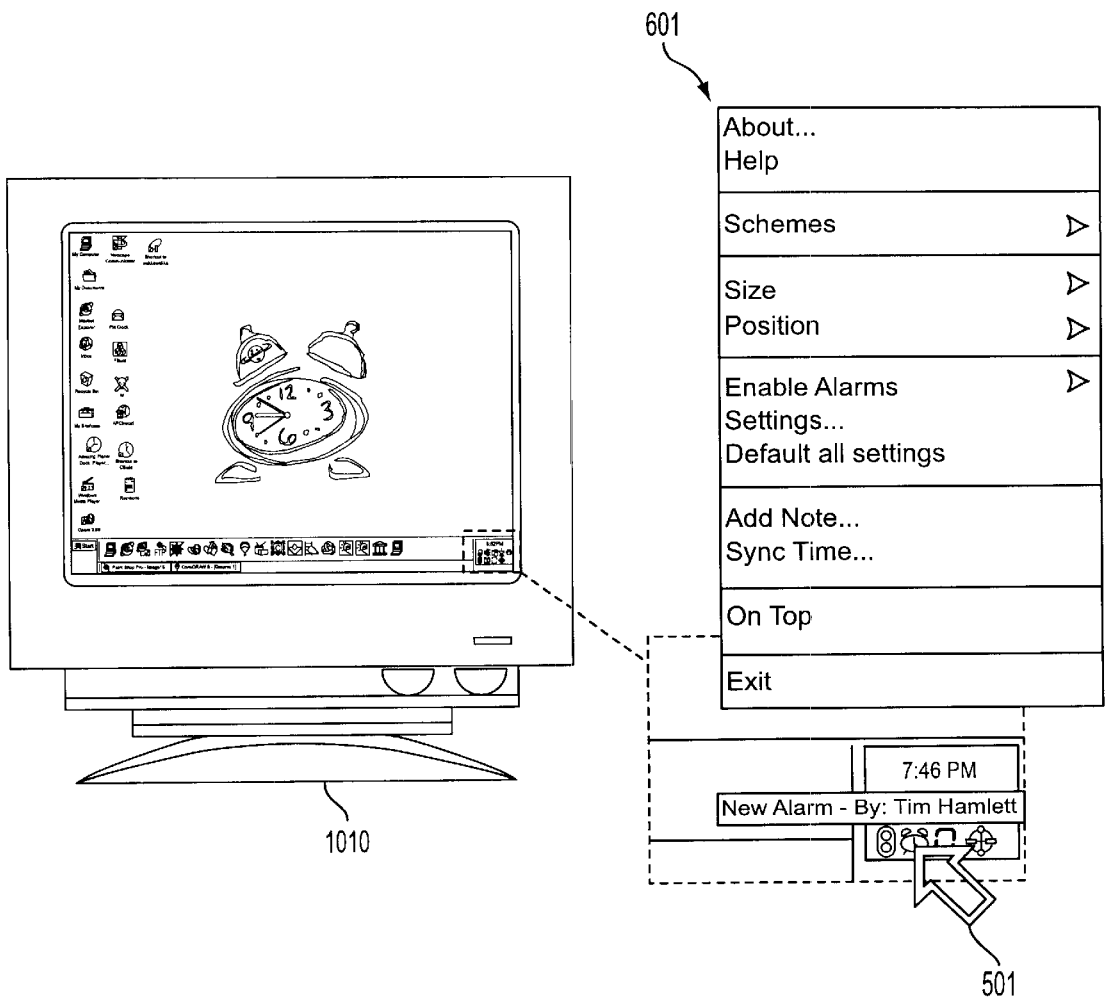
FIG. 7 is an illustration of additional methods of GUI objects sub-control accessibility according to an embodiment of the present invention.

FIG. 4 shows an example of a GUI object 401 as it appears on a computer display 410. The GUI object presented on the screen of the computing device may incorporate interactive control areas, as shown in FIG. 5. User control of the GUI object 401 may be achieved by activating the control methods of a pointing device 501 or control methods of a pointing device in combination with other control methods, keys, and buttons. By activating the control device, additional GUI control surfaces, menus, sub-menus and processes, as shown in 601, may be created and implemented, as shown in FIG. 6 and 7. GUIs may store all user selected or modified operational parameters in a specialized memory accessible to the GUI upon initialization and application operation. The control surface created by activating GUI interactive control areas may include the ability to modify schemes, change the size, alter the position, set and disable alarms, specify settings, select sounds, add notes, and other control functions. Thus, constant update and reconfiguration may be avoided.

Figure 8:
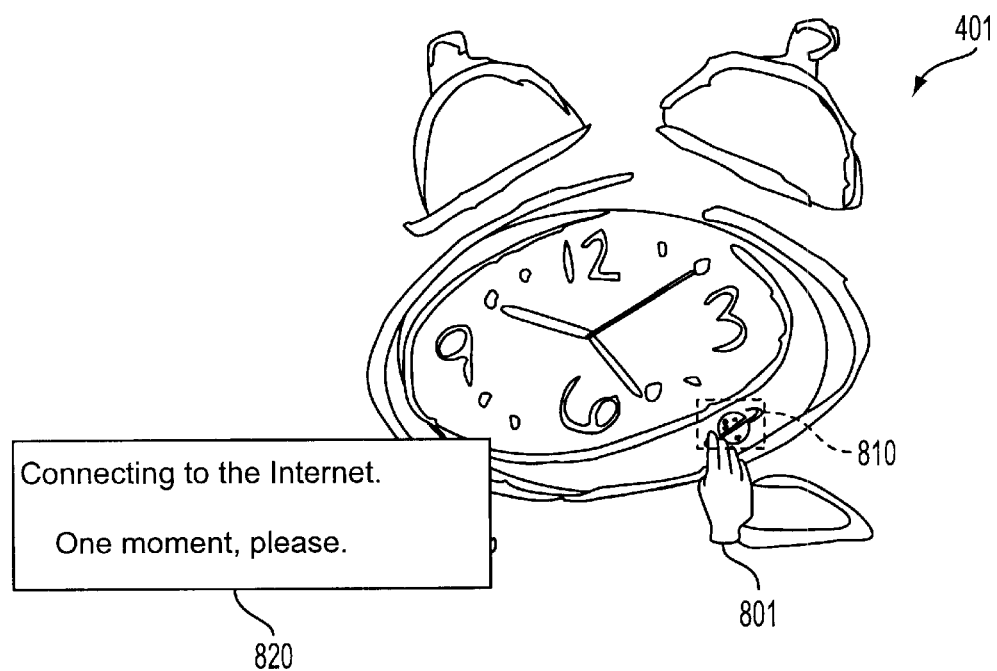
FIG. 8 is an illustration of a subdivision of a GUI object control area into additional areas of control according to an embodiment of the present invention.

GUI pointing device 801 and behavior of the GUI may change based on the position of the pointing device in the GUI control area or sub-control area 810, as shown in FIG. 8. By activating the control device while pointing at specific control or sub-control areas 810, additional GUI control surfaces, processes, and methods may be created. Sub-control areas may be defined and arranged consistent with the operation of the user application. For example, the GUI pointing device cursor may change into a different image when positioned over a particular logo for Internet access thereby informing the user that activating the cursor at this location will connect the user to the Internet, as illustrated in 820.

Figure 9A:
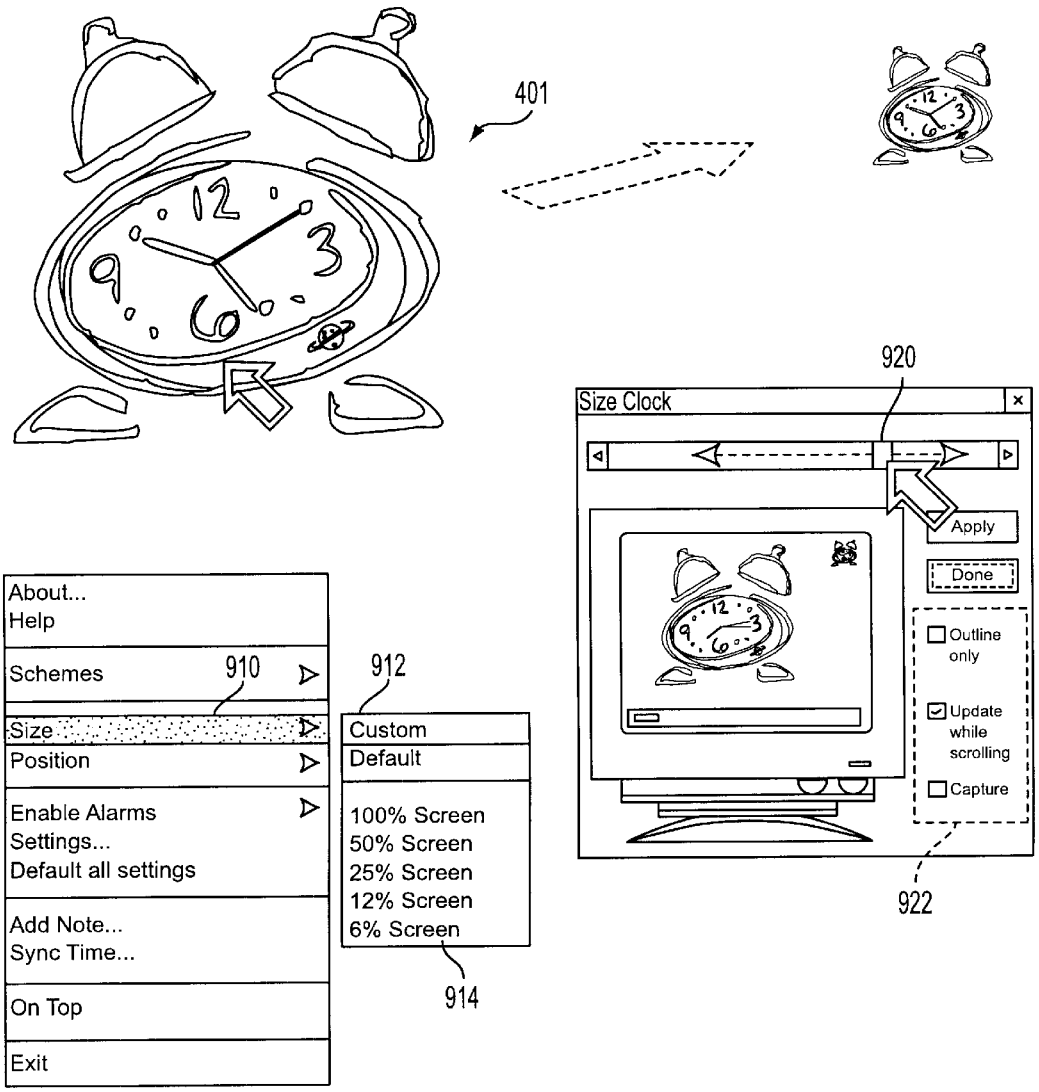
FIG. 9a is an illustration of scalability functions of a GUI object according to an embodiment of the present invention.
Figure 9B:
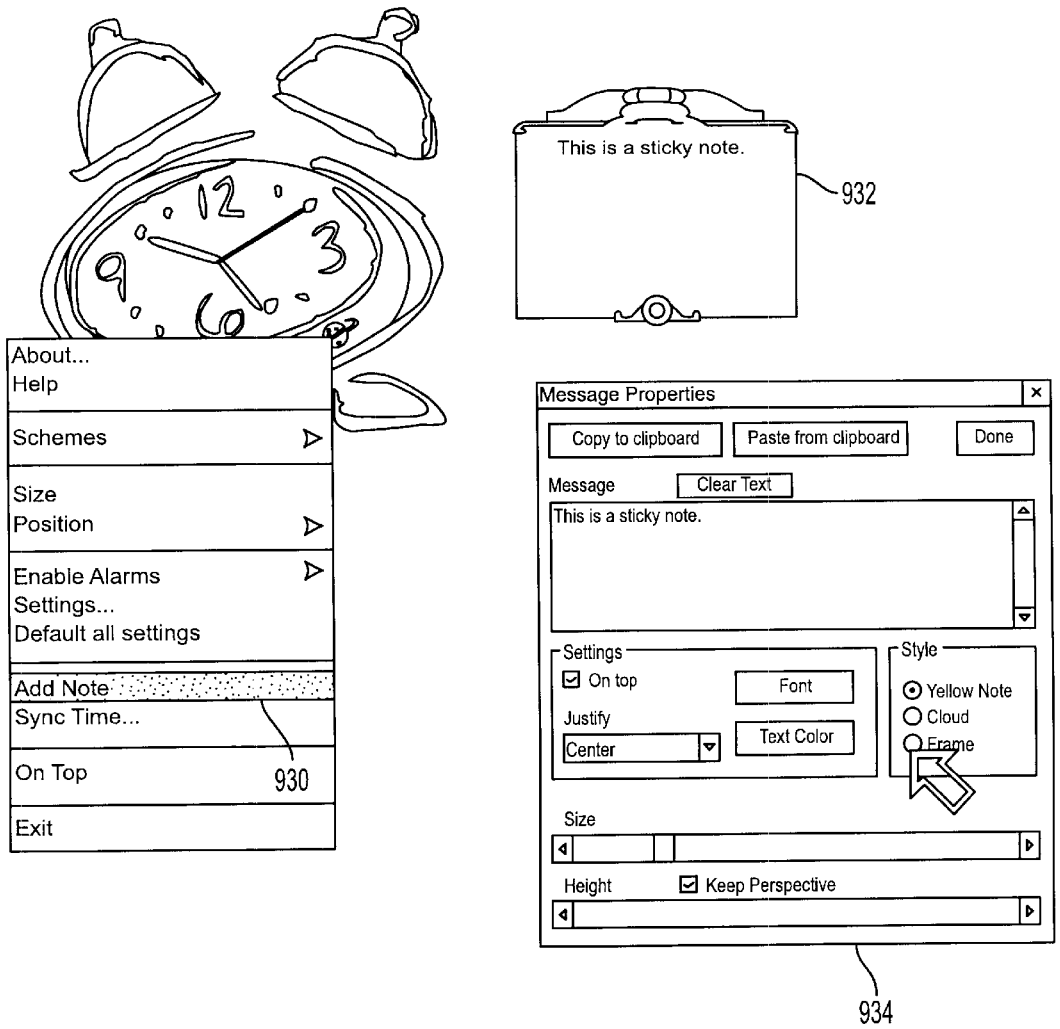
FIG. 9b is an illustration of different methods available to a user for controlling the scale of a GUI object according to an embodiment of the present invention.

The GUI object may also encompass scalability functions, as illustrated in FIG. 9*a*. A scale control may be accessed via menus, sub-menus, and processes and may provide interactive and fixed scaling options in any combination. The scale control may provide various display options including perimeter outlining, background capture, and real-time scaling animation and other display options as may be appropriate for desired user operation. For example, fixed scaling options may include a scale shortcut operation which scales the size of the GUI based on the percentage of space occupied on the screen, as shown by 914. A user may select a user selected process, at 910, and a user selected process option, at 912. A default size may also be available to the user. If the user desires to customize the size of the GUI, an interactive scaling slide control may be available, as shown by 920. Additional scale control display options may include updating the GUI, capturing the background, and displaying only the outline of the GUI object while increasing and decreasing the size of the GUI, as shown by 922. The scale control may provide various display options including image changeability, image animation, text formatting and manipulation functions, aspect ratio scaling, and other applicable appropriate processes, as shown in FIG. 9*b*. For example, a user selected process may include a message note 932 that reminds the user of certain events or tasks that the user may deem as being important, at 930. The user may customize the appearance of the message note and include a text message, at screen 934. The scale control may be used to minimize and maximize the size of each individual message note. Thus, users have the option of increasing the size of more important messages and decreasing the size of messages having less importance.

Figure 10A:
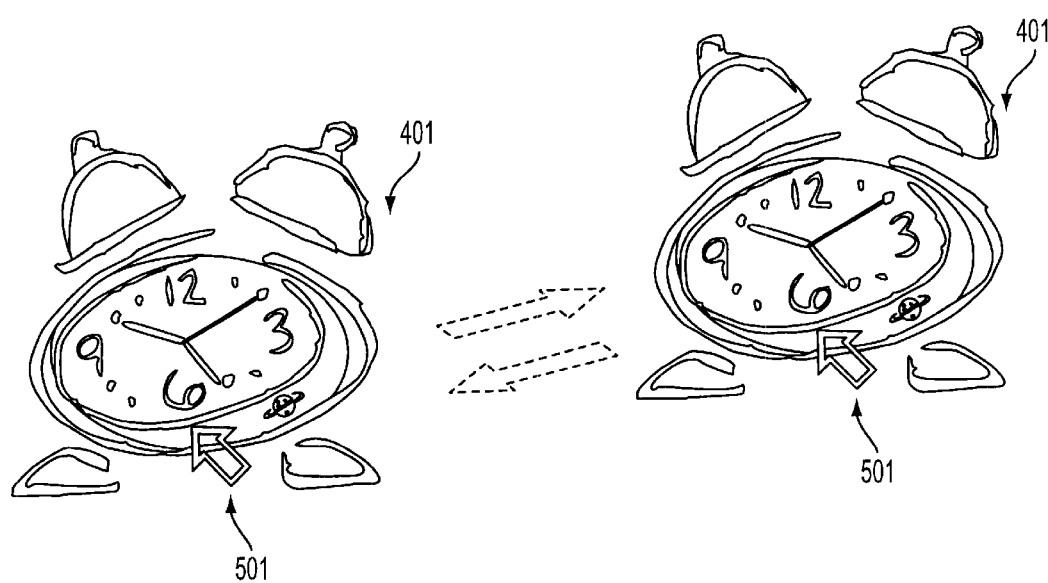
FIG. 10a is an illustration of a position function of a GUI object according to an embodiment of the present invention.
Figure 10B:
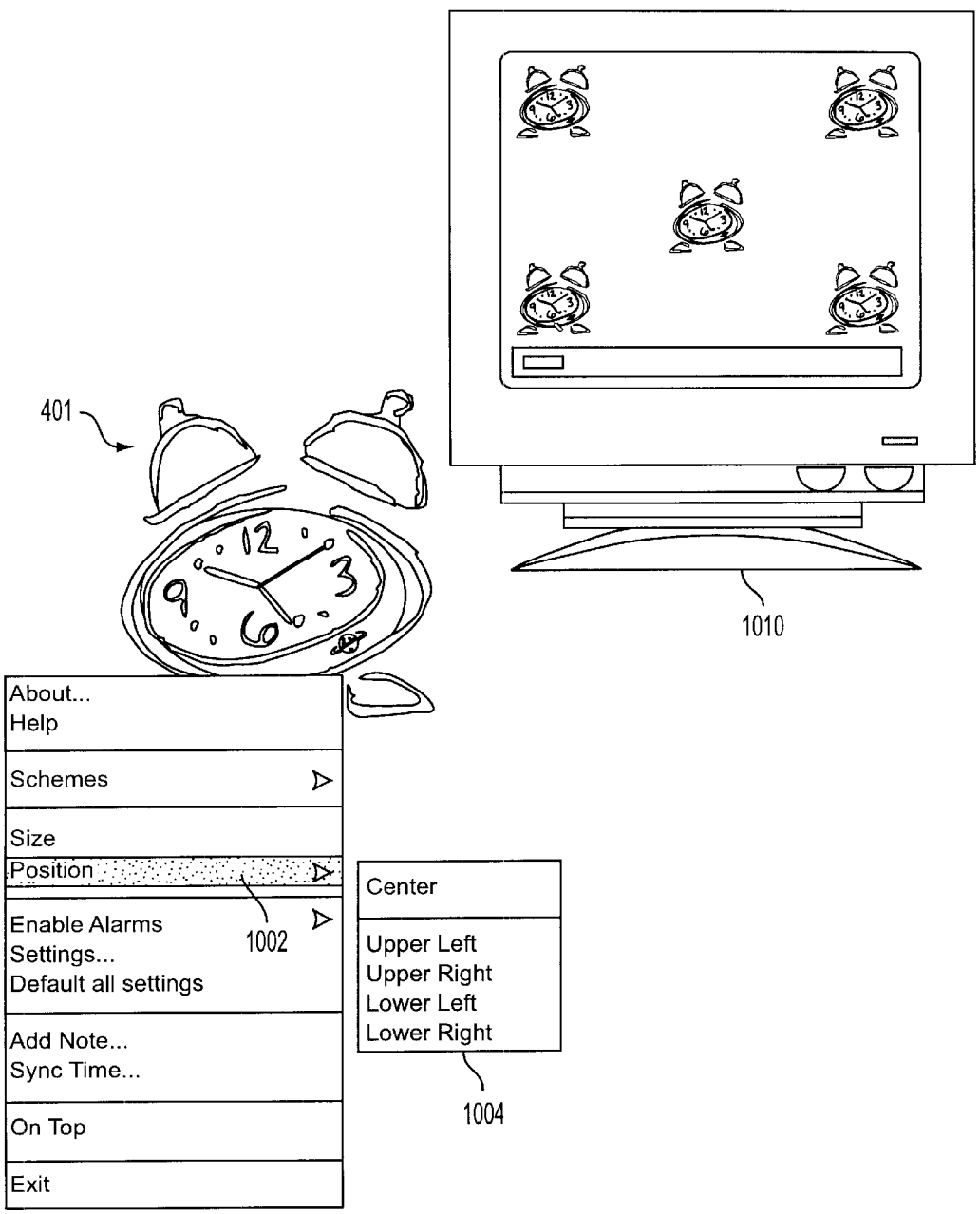
FIG. 10b is an illustration of a position function of a GUI object according to an embodiment of the present invention.

The screen position of the GUI may be altered by dragging the GUI object to the desired location by the pointing device 501, as shown in FIG. 10*a*. Alternatively, the display positioning control may be accessed via menus, sub-menus, and user selected processes and may provide appropriate fixed or dynamic GUI display position options, as shown in FIG. 10b. For example, the user may utilize user selectable display position shortcut options, such as screens 1002 and 1004, which provide placements options at the center or corners of the computer screen, as shown in 1010.

Figure 11A:
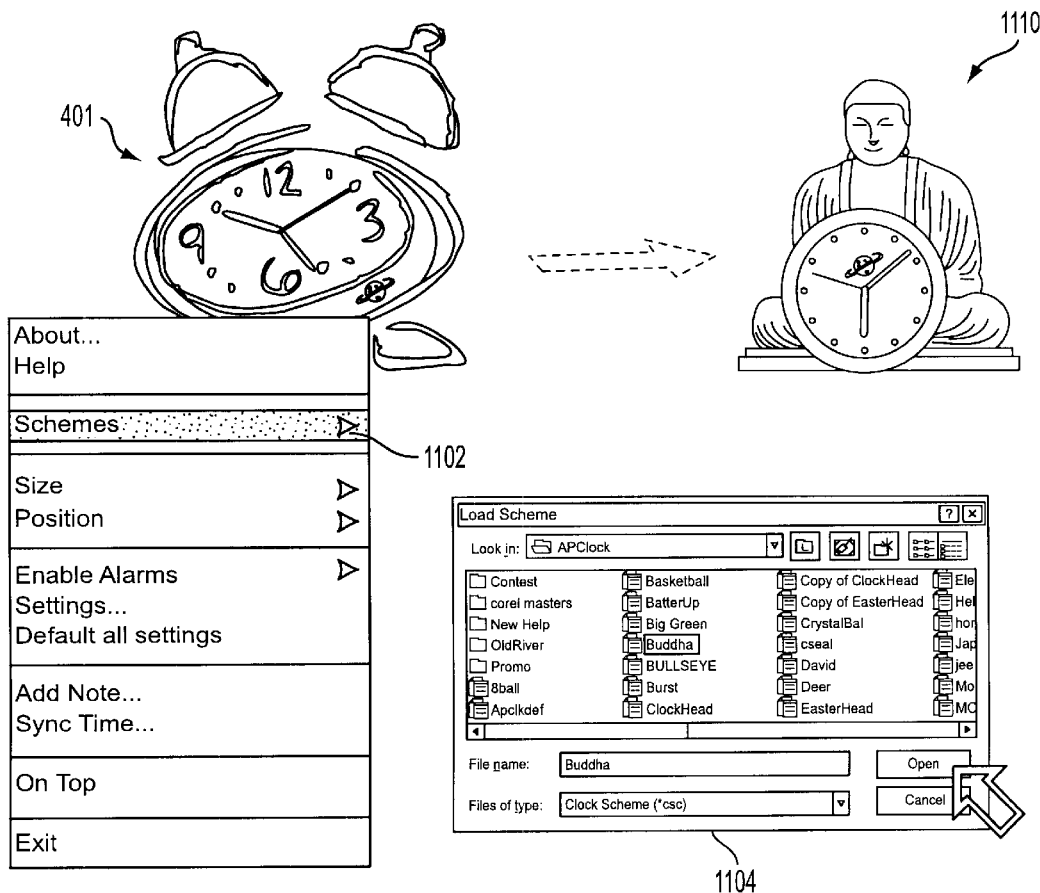
FIG. 11a is an illustration of a GUI object's ability to display other pre-processed GUI objects according to an embodiment of the present invention.
Figure 11B:
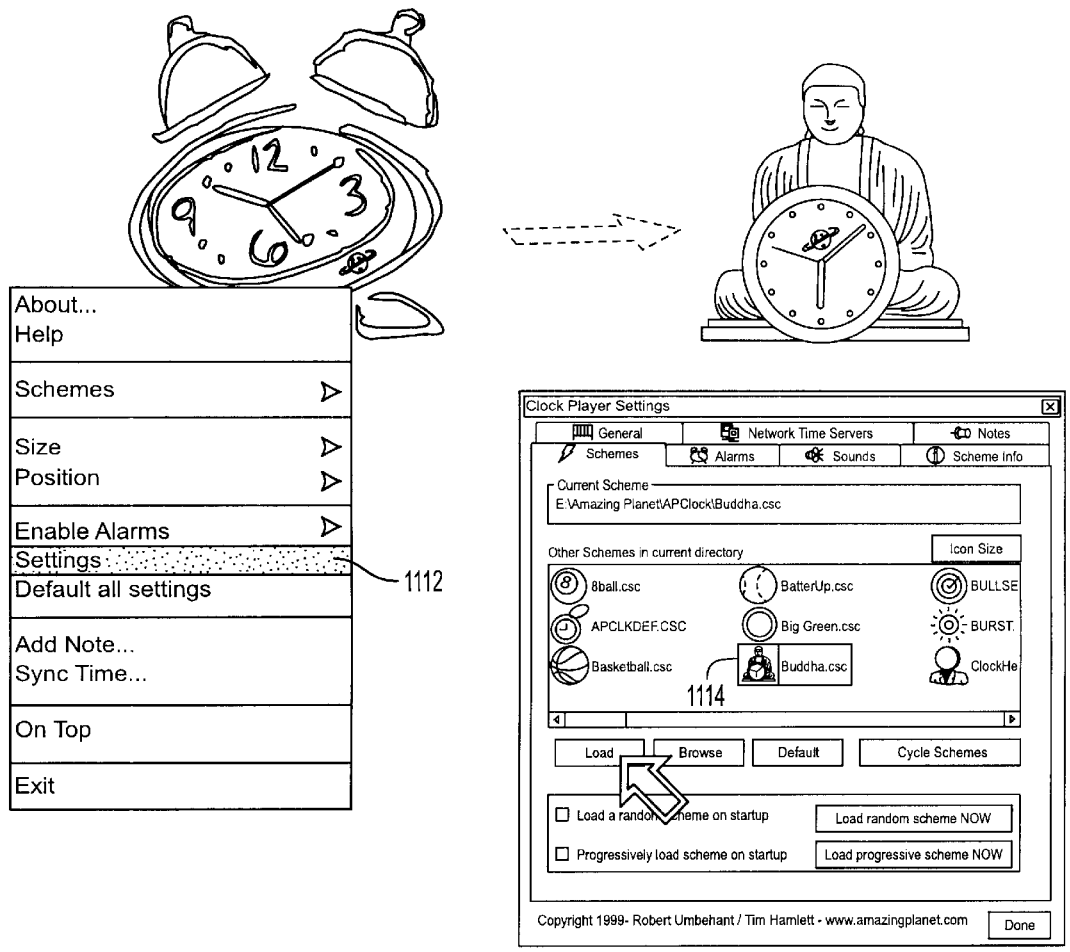
FIG. 11b is an illustration of a changeable nature of a GUI object according to an embodiment of the present invention.

At 1102, the display image of the GUI may be changed by selecting a new vector drawing image data file from a file loading GUI as shown in screen 1104 at a user's discretion, as shown in FIG. 11a. For example, the clock image 401 may be changed to a Buddha image 1110. At "Settings" option 1112, file load GUI may provide additional display options, such as 1114, including displayed image rotation options on startup or by immediate selection, as illustrated in FIG. 11b.

The present invention provides a method and system for independently creating a controllable GUI object where the GUI image data is stored in optimized vector image data format and displayed from the optimized vector image data thereby resulting in minimal loss of original design image resolution at any shape and/or size.

Other embodiments and uses of the invention will be apparent to those skilled in the art from consideration of the specification and practice of the invention disclosed herein. The specification and examples should be considered exemplary only.

What is claimed is:

1. A method for creating a controllable, shapeable, and scalable graphical user interface object defined by vector image data, the method comprising the steps of:

storing data associated with a graphical user interface object image in an optimized vector image data format wherein optimized vector image data comprises vector image data defining image components associated with an interactive application program and wherein the vector image data comprises a vector image file, a vector mask file and a vector overlay file;

storing at least one data file associated with the interactive application program;

parsing, encrypting, and compressing the optimized vector image data;

saving the optimized vector image data into a memory;

loading the optimized vector image data from the memory into the interactive application program wherein the interactive application program comprises animation functionality;

decompressing and decrypting the optimized vector image data;

processing the vector image data for defining display characteristics of the graphical user interface object image wherein display characteristics comprise display size, display shape and display position; and displaying the graphical user interface object image in accordance with the display characteristics wherein the graphical user interface object image contains functionality associated with the interactive application program and wherein the optimized vector image data is accessed when the graphical user interface object is resized or reshaped so that the graphical user interface object displays minimal loss of original design image resolution.

2. The method of claim 1 wherein the optimized vector image data further comprises ancillary image and data files.

3. The method of claim 1 wherein the optimized vector image data further comprises program control and sub-control areas.

4. The method of claim 1 wherein operation of the interactive application program is prevented when the graphical user interface object data is altered by an unauthorized source to ensure security.

5. The method of claim 1 wherein the step of displaying the graphical user interface object image further comprises scaling the graphical user interface object image wherein the graphical user interface object image comprises at least one void and at least one discontinuous area.

6. The method of claim 1 further comprising the step of executing predefined and user initiated actions.

7. The method of claim 1 wherein the optimized vector image data is created separately and independently from the interactive application program.

8. The method of claim 1 wherein the graphical user interface object image is changeable at a user's discretion.

9. The method of claim 1 wherein the graphical user interface comprises a clock design program for use on a computer wherein a clock image is displayed on a computer screen.

10. The method of claim 9 wherein the user activates one or more alarms as reminders wherein the one or more alarms contain one or more visual options.

11. The method of claim 9 wherein the user activates one or more alarms as reminders wherein the one or more alarms contain one or more audio options.

12. The method of claim 9 wherein the user activates one or more alarms as reminders wherein the one or more alarms contain one or more animated image options.

13. The method of claim 9 wherein the user creates message notes as reminders displayed on the computer screen wherein the message notes are scaleable.

14. A system for creating a controllable, shapeable, and scalable graphical user interface object defined by vector image data, the system comprising:

a storage means for storing data associated with a graphical user interface object image in an optimized vector image data format wherein optimized vector image data comprises vector image data defining image components associated with an interactive application program and wherein the vector image data comprises a vector image file, a vector mask file and a vector overlay file;

a data file storage means for storing at least one data file associated with the interactive application program;

a processor for parsing, encrypting, and compressing the optimized vector image data;

a memory for saving the optimized vector image data;

a post-processor for loading the optimized vector image data from the memory into the interactive application program wherein the interactive application program comprises animation functionality; decompressing and decrypting the optimized vector image data; and processing the vector image data for defining display characteristics of the graphical user interface object image wherein display characteristics comprise display size, display shape and display position; and a display means for displaying the graphical user interface object image in accordance with the display characteristics wherein the graphical user interface object image contains functionality associated with the interactive application program and wherein the optimized vector image data is accessed when the graphical user interface object is resized or reshaped so that the graphical user interface object displays minimal loss of original design image resolution.

15. The system of claim 14 wherein the optimized vector image data further comprises ancillary image and data files.

16. The system of claim 14 wherein the optimized vector image data further comprises program control and sub-control areas.

17. The system of claim 14 wherein operation of the interactive application program is prevented when the graphical user interface object data is altered by an unauthorized source to ensure security.

18. The system of claim 14 wherein the display means for displaying the graphical user interface object image further comprises scaling the graphical user interface object image wherein the graphical user interface object image comprises at least one void and at least one discontinuous area.

19. The system of claim 14 further comprises predefined and user initiated actions.

20. The system of claim 14 wherein the optimized vector image data is created separately and independently from the interactive application program.

21. The system of claim 14 wherein the graphical user interface object image is changeable at a user's discretion.

22. The system of claim 14 wherein the graphical user interface comprises a clock design program for use on a computer wherein a clock image is displayed on a computer screen.

23. The system of claim 22 wherein the user activates one or more alarms as reminders wherein the one or more alarms contain one or more visual options.

24. The system of claim 22 wherein the user activates one or more alarms as reminders wherein the one or more alarms contain one or more audio options.

25. The system of claim 22 wherein the user activates one or more alarms as reminders wherein the one or more alarms contain one or more animated image options.

26. The system of claim 22 wherein the user creates message notes as reminders displayed on the computer screen wherein the message notes are scaleable.

* * * * *

UNITED STATES PATENT AND TRADEMARK OFFICE
CERTIFICATE OF CORRECTION

PATENT NO.   : 6,606,103 B1                                              Page 1 of 1
DATED        : August 12, 2003
INVENTOR(S)  : Tim Hamlett and Robert Umbehant It is certified that error appears in the above-identified patent and that said Letters Patent is hereby corrected as shown below:

<u>Title page,</u>
Item [12], Inventor's name should read:
-- Hamlett et al. --
Item [75], Inventor's name should read:
-- Tim Hamlett --

Signed and Sealed this

Eleventh Day of November, 2003

JAMES E. ROGAN
*Director of the United States Patent and Trademark Office*